(12) United States Patent
Ishimaru et al.

(10) Patent No.: US 11,585,375 B2
(45) Date of Patent: Feb. 21, 2023

(54) DAMPER BEARING AND DAMPER

(71) Applicant: KAWASAKI JUKOGYO KABUSHIKI KAISHA, Kobe (JP)

(72) Inventors: Hidetsugu Ishimaru, Kobe (JP); Ryota Takeuchi, Ikoma-gun (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 62 days.

(21) Appl. No.: 17/275,868

(22) PCT Filed: May 24, 2019

(86) PCT No.: PCT/JP2019/020571
§ 371 (c)(1),
(2) Date: Mar. 12, 2021

(87) PCT Pub. No.: WO2020/054133
PCT Pub. Date: Mar. 19, 2020

(65) Prior Publication Data
US 2022/0056952 A1 Feb. 24, 2022

(30) Foreign Application Priority Data

Sep. 12, 2018 (JP) .............................. JP2018-170599

(51) Int. Cl.
*F16C 27/02* (2006.01)
*F16C 32/06* (2006.01)
(Continued)

(52) U.S. Cl.
CPC ............ *F16C 27/045* (2013.01); *F16C 27/02* (2013.01); *F16C 32/0677* (2013.01); *F16F 15/0235* (2013.01)

(58) Field of Classification Search
CPC ... F16C 27/02; F16C 32/0677; F16F 15/0235; F16F 15/0237; F01D 25/164
See application file for complete search history.

(56) References Cited

U.S. PATENT DOCUMENTS

| 5,137,373 A | * | 8/1992 | Ide | ........................ F16C 17/035 |
| | | | | 384/119 |
| 5,421,655 A | * | 6/1995 | Ide | ...................... F16F 15/0237 |
| | | | | 384/99 |

(Continued)

FOREIGN PATENT DOCUMENTS

| CN | 105899824 A | 8/2016 |
| FR | 2685415 A1 | 6/1993 |

(Continued)

*Primary Examiner* — Phillip A Johnson
(74) *Attorney, Agent, or Firm* — Oliff PLC

(57) ABSTRACT

A damper bearing includes: a bearing portion that supports a rotary shaft; and a tubular portion that is located around an outer circumference of the bearing portion, and has an outer surface attachable to a structural member. The bearing portion can be a hydrostatic bearing that supports the rotary shaft with a predetermined bearing clearance therebetween. The tubular portion includes a plurality of planar slits arranged circumferentially at predetermined intervals in the tubular portion. Each slit extends radially from an open end at the outer surface, and extends circumferentially in an arc to a predetermined point in a region between the outer and inner surfaces. The tubular portion includes a bearing fluid supply hole that is formed in a region where none of the planar slits is situated, and extends from the outer surface of the tubular portion to the bearing portion without passing through any of the planar slits.

13 Claims, 8 Drawing Sheets

(51) Int. Cl.
*F16C 27/04* (2006.01)
*F16F 15/023* (2006.01)

(56) References Cited

U.S. PATENT DOCUMENTS

| | | | |
|---|---|---|---|
| 5,425,067 A | 6/1995 | Sano et al. | |
| 5,513,917 A * | 5/1996 | Ide | F01D 25/164 384/100 |
| 5,603,574 A * | 2/1997 | Ide | F16C 17/065 384/119 |
| 8,083,413 B2 | 12/2011 | Ertas | |
| 8,353,633 B2 * | 1/2013 | Griffin | F16C 35/077 384/255 |
| 2005/0111767 A1 | 5/2005 | Ishii et al. | |
| 2009/0263057 A1 | 10/2009 | Kanki et al. | |
| 2017/0012570 A1 | 1/2017 | Bauer | |

FOREIGN PATENT DOCUMENTS

| | | | | |
|---|---|---|---|---|
| JP | 2004-278580 A | | 10/2004 | |
| JP | 2007-56976 A | | 3/2007 | |
| JP | 2010175008 A | * | 8/2010 | F16C 27/02 |

\* cited by examiner

DAMPER BEARING AND DAMPER

TECHNICAL FIELD

The present invention relates to a damper bearing and a damper which have a damper function.

BACKGROUND ART

Various bearings have been conventionally used to support different kinds of rotary shafts. Examples of the bearings include rolling bearings, sliding bearings, and hydrostatic bearings. The rotary shafts are subjected to violent vibration in a specific rotational speed range or under load conditions. The vibration of the rotary shafts needs to be damped to improve the performance of rotary machines.

A prior art technique for preventing the violent vibration is to effect vibration damping in a bearing. For example, a tubular damper element is known which is disposed on an outer circumferential portion of a rolling bearing to damp radial vibration transmitted to the bearing (see Patent Literatures 1 and 2, for example). In such a damper element, a slit is formed between inner and outer surfaces of a tubular body, and a viscous fluid is supplied into the slit to achieve the damper effect.

Another prior art technique hitherto proposed is to use a damper bearing. The damper bearing includes a bearing for supporting a rotary shaft, a centering spring for supporting the bearing with a suitable stiffness, and a damper for vibration damping. An example of the damper bearing of prior art is one which includes a damper bridge concentrically interposed between inner and outer rims with the aid of S-shaped centering springs (see Patent Literature 3). This damper bearing employs a gas bearing and includes integral wire mesh dampers disposed on both sides of the damper bridge, namely between the damper bridge and the inner rim and between the damper bridge and the outer rim.

CITATION LIST

Patent Literature

PTL 1: Japanese Laid-Open Patent Application Publication No. 2004-278580
PTL 2: Japanese Laid-Open Patent Application Publication No. 2007-56976
PTL 3: U.S. Pat. No. 8,083,413 B2

SUMMARY OF INVENTION

Technical Problem

Known types of bearings include hydrostatic bearings. Among the hydrostatic bearings, hydrostatic gas bearings are advantageous in that they are able to accommodate high-speed rotation thanks to their low friction properties and that they allow the bearing portion to be "oil fee" unlike rolling bearings and sliding bearings which require oil lubrication. However, the gas bearings have the disadvantage of low vibration damping performance. Additionally, many of high-speed rotary machines employing the gas bearings are small in size and pose severe space limitations.

If an attempt is made to combine a damper element as taught in Patent Literature 1 or 2 with a gas bearing, the attempt at combined use of the damper element and the gas bearing would fail because neither Patent Literature 1 nor Patent Literature 2 discloses a mechanism for supplying a gas to the bearing portion and a mechanism for separating the gas from the viscous fluid.

In Patent Literature 3, the damper bridge is disposed in an axially central region of the bearing with the aid of the S-shaped centering springs, and thus the radial dimension of the bearing is large. This bearing is difficult to use as a bearing for a small machine. Further, the wire mesh dampers (damper elements) cannot be disposed in the regions where the S-shaped centering springs are situated, and these regions make no contribution to the damping action. As such, the bearing of Patent Literature 3 has low damping performance.

It is therefore an object of the present invention to provide: a damper bearing including a gas bearing, the damper bearing having a reduced radial dimension and having a damper function in which the entire axial length of the bearing contributes to damping; and a damper having a reduced radial dimension and having the same damper function as the damper bearing.

Solution to Problem

To achieve the above object, a damper bearing according to the present invention includes: a bearing portion that supports a rotary shaft; and a tubular portion located around an outer circumference of the bearing portion, the tubular portion having a predetermined radial thickness and having an outer surface attachable to a structural member, wherein the bearing portion is configured as a hydrostatic bearing that supports the rotary shaft with a predetermined bearing clearance between the hydrostatic bearing and the rotary shaft, the tubular portion includes a plurality of planar slits located between the outer surface of the tubular portion and an inner surface of the tubular portion, each planar slit having a predetermined width, extending circumferentially, and further extending through an entire axial length of the tubular portion, the planar slits are arranged circumferentially at predetermined intervals in the tubular portion, each planar slit has an open end at the outer surface of the tubular portion, extends radially from the open end, and extends circumferentially in an arc to a predetermined point in a region between the outer surface and the inner surface, and the tubular portion includes a bearing fluid supply hole formed in a region where none of the planar slits is situated, the bearing fluid supply hole extending from the outer surface of the tubular portion to the bearing portion without passing through any of the planar slits.

In this configuration, a bearing fluid can be suitably supplied to the bearing portion through the bearing fluid supply hole extending from the outer surface to the bearing portion without passing through any of the planar slits, and thereby the function of a hydrostatic bearing can be achieved. As such, a damper bearing can be constructed which has the function of a hydrostatic bearing and in which vibration transmitted radially from the bearing portion to the tubular portion is damped over the entire axial length of the tubular portion by the planar slits each of which extends circumferentially in a region between the outer and inner surfaces of the tubular portion. The bearing portion may be included in the tubular portion; thus, the damper bearing having a damper function provided by the planar slits can be configured to have a small radial dimension.

The tubular portion may further include: an outer surface cavity formed in the outer surface, the outer surface cavity being radially outward of the planar slit; and a damper fluid supply hole through which a damper fluid is supplied from the outer surface at least into the outer surface cavity or into the planar slit.

In this configuration, where the damper fluid is supplied at least into the planar slit or into the outer surface cavity through the damper fluid supply hole, radial vibration transmitted to the bearing portion can be suitably damped by a damper effect exhibited by the damper fluid supplied into the planar slit and/or the outer surface cavity.

The bearing fluid supply hole and the damper fluid supply hole may be at different circumferential locations in the tubular portion, and a sealing member may be disposed between the bearing fluid supply hole and the damper fluid supply hole to prevent the damper fluid from being mixed into a bearing fluid supplied through the bearing fluid supply hole.

In this configuration, mixing of the damper fluid into the bearing fluid can be reliably prevented by the sealing member disposed between the bearing fluid supply hole and damper fluid supply hole which are at different circumferential locations in the tubular portion.

The tubular portion may further include: an outer surface cavity formed in the outer surface, the outer surface cavity being radially outward of the planar slit; and a solid damper element disposed at least in the outer surface cavity or in the planar slit. The solid damper element used may be, for example, a wire mesh having a predetermined thickness, a thin bendable plate with a slit, or an assembly of spherical particles made of resin.

In this configuration, vibration damping can be achieved by the solid damper element disposed at least in the planar slit of the tubular portion or in the outer surface cavity of the outer surface.

The tubular portion may further include a retaining member that prevents axial movement of the solid damper element, the retaining member being disposed at each axial end of the tubular portion.

In this configuration, axial movement of the solid damper element disposed in the outer surface cavity of the outer surface of the tubular portion can be prevented by the retaining member. For example, even the solid damper element constituted by spherical particles can be retained in a stable position by the retaining member.

A damper according to the present invention is adapted to damp vibration transmitted radially from a rotary shaft, the damper including a tubular portion to be located around an outer circumference of the rotary shaft, the tubular portion having a predetermined radial thickness and having an outer surface attachable to a structural member, wherein the tubular portion includes a plurality of planar slits located between the outer surface of the tubular portion and an inner surface of the tubular portion, each planar slit having a small width, extending circumferentially, and further extending through an entire axial length of the tubular portion, the planar slits are arranged circumferentially at predetermined intervals in the tubular portion, each planar slit has an open end at the outer surface of the tubular portion, extends radially from the open end, and extends circumferentially in an arc to a predetermined point in a region between the outer surface and the inner surface, and the tubular portion further includes: an outer surface cavity radially outward of the planar slit; and a solid damper element disposed at least in the outer surface cavity or in the planar slit.

In this configuration, a damper function in which radially transmitted vibration is damped over the entire axial length can be achieved by the solid damper element disposed at least in the outer surface cavity of the outer surface of the tubular portion or in each planar slit extending circumferentially in a region between the outer and inner surfaces of the tubular portion. The damper having a high level of damper function provided by the solid damper element can be constructed without the use of a damper fluid or the like.

The tubular portion may further include a retaining member that prevents axial movement of the solid damper element, the retaining member being disposed at each axial end of the tubular portion.

In this configuration, axial movement of the solid damper element disposed in the outer surface cavity of the outer surface of the tubular portion can be prevented by the retaining member. For example, even the solid damper element constituted by spherical particles can be retained in a stable position by the retaining member.

The solid damper element may be a wire mesh having a predetermined thickness. In this configuration, vibration propagating radially from the inner surface toward the outer surface of the tubular portion can be damped by friction arising from deformation of the wire mesh.

The solid damper element may be a thin bendable plate with a slit. In this configuration, vibration propagating radially from the inner surface toward the outer surface of the tubular portion can be damped by bending of the plate at the slit.

The solid damper element may be an assembly of spherical particles. In this configuration, vibration propagating radially from the inner surface toward the outer surface of the tubular portion can be damped by friction arising from movement of the spherical particles.

Advantageous Effects of Invention

The present invention can provide a damper bearing that is able to exhibit a damper function by virtue of planar slits provided over the entire axial length of a tubular portion and that is usable as a hydrostatic bearing in which a bearing fluid is supplied to a bearing portion through a region where none of the planar slits extending circumferentially in the tubular portion is situated.

The prevent invention can further provide a damper able to damp vibration by a solid damper element over the entire axial length of the damper.

DESCRIPTION OF EMBODIMENTS

Figure 1:
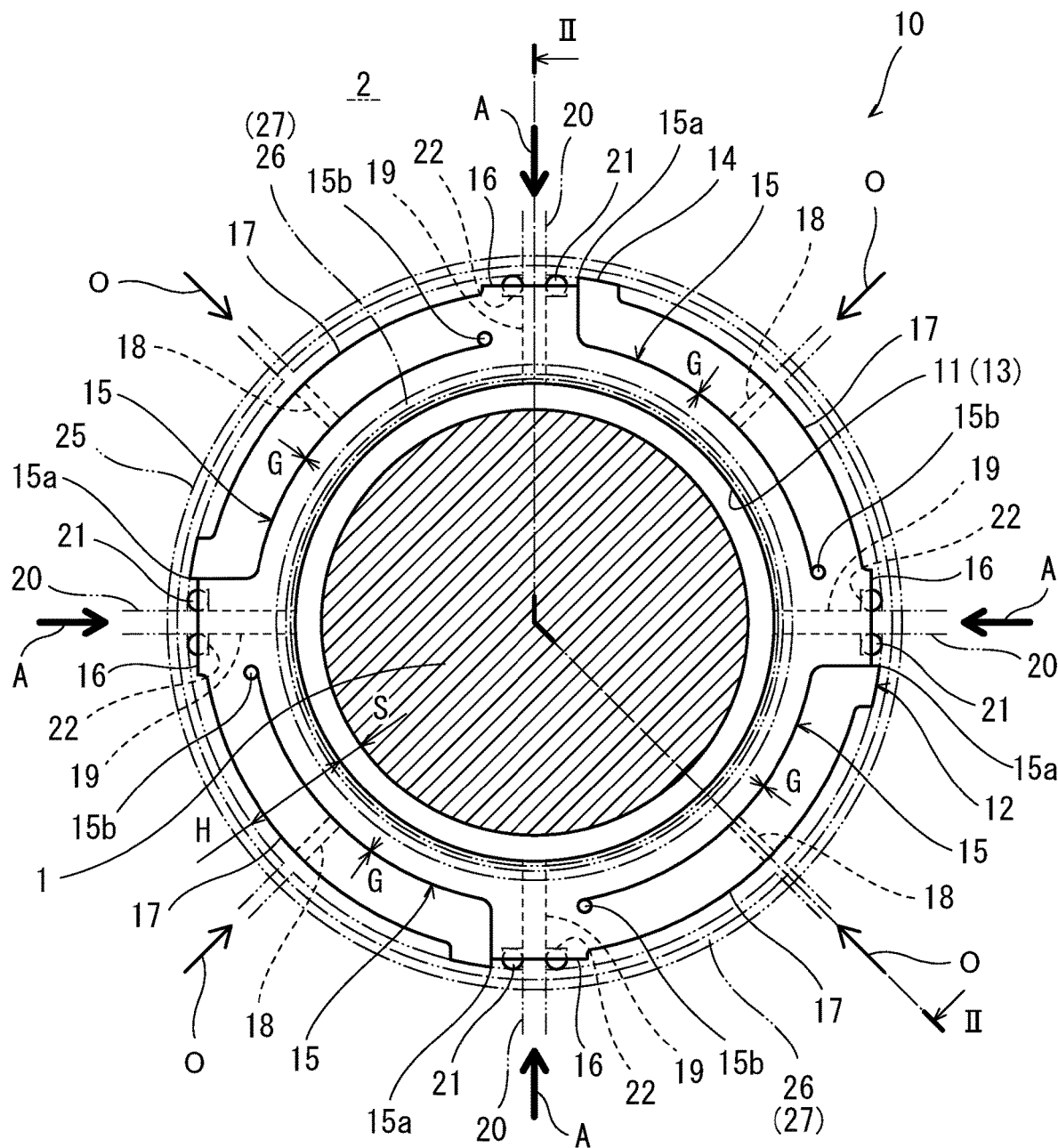
FIG. 1 is a front view of a first damper bearing according to Embodiment 1 of the present invention.

Hereinafter, embodiments of the present invention will be described with reference to the drawings. In the following embodiments, damper bearings 10 and 30 each having the function of a hydrostatic bearing are mainly described. The up-down and left-right directions in the specification and claims of this application should be understood as those defined with respect to the first damper bearing 10 viewed as in FIG. 1. The direction perpendicular to the sheet plane of FIG. 1 (the direction in which a rotary shaft 1 extends) is referred to as the axial direction. The inter-element gaps and the like are exaggerated in the drawings.

Configuration of Damper Bearing according to Embodiment 1

Figure 2:
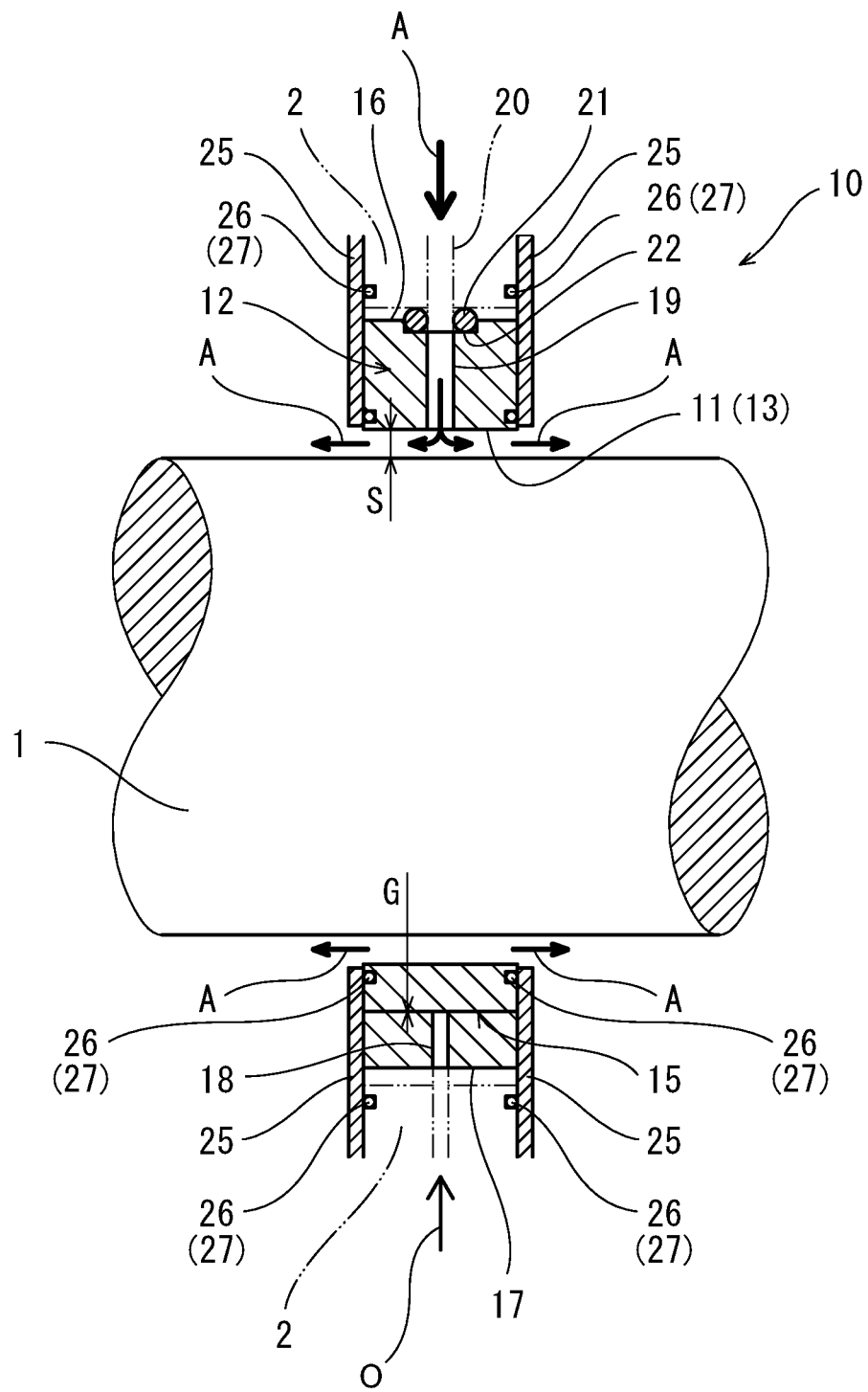
FIG. 2 is a cross-sectional view of the first damper bearing taken along the line II-II of FIG. 1.

FIG. 1 is a front view of the first damper bearing 10 according to Embodiment 1. FIG. 2 is a cross-sectional view of the first damper bearing 10 taken along the line II-II of FIG. 1. The first damper bearing 10 according to Embodiment 1 includes a bearing portion 11 that supports the rotary shaft 1 and a tubular portion 12 located around the outer circumference of the bearing portion 11 and attachable to a structural member 2 (a casing, for example). The bearing portion 11 is a hydrostatic bearing, and an inner surface 13 of the tubular portion 12 serves as the bearing portion 11. The function of the bearing portion 11 as a hydrostatic bearing is implemented as follows: a high-pressure bearing fluid A is supplied between the inner surface 13 and the rotary shaft 1 to form a predetermined bearing clearance S, and the rotary shaft 1 is supported by the bearing fluid A. The tubular portion 12 has a predetermined radial thickness H between the inner and outer surfaces 13 and 14.

The tubular portion 12 includes a plurality of planar slits 15 located between the inner and outer surfaces 13 and 14 and extending through the entire axial length of the tubular portion 12. Each planar slit 15 has an open end at the outer surface 14 of the tubular portion 12, extends radially from the open end, and extends circumferentially in an arc to a predetermined point in a region between the outer surface 14 and the inner surface 13. Each planar slit 15 has a predetermined width G. The "width" of the planar slit 15 refers to the dimension in the radial direction of the tubular portion 12. The predetermined width G may be, for example, a small width of about 0.1 to 0.5 mm. The planar slits 15 can be formed by wire electrical discharge machining.

The planar slits 15 are arranged circumferentially at predetermined intervals in the tubular portion 12. In this embodiment, four planar slits 15 are arranged circumferentially at regular intervals. The number of the planar slits 15 is not limited to that in this embodiment.

In the outer surface 14 of the tubular portion 12, a region circumferentially adjacent to one side of the open end of each planar slit 15 is at the end of the outer diameter of the tubular portion 12, and a region circumferentially adjacent to the other side of the open end is formed as a recessed portion 16 which is radially inward of the end of the outer diameter. The outer surface 14 of the tubular portion 12 is provided with outer surface cavities 17 each of which is formed by cutting an outer circumferential region of the tubular portion 12 to a predetermined depth. The outer surface cavity 17 extends from the recessed portion 16 to a point which is at a predetermined distance from the open end of the planar slit 15. The outer circumferential region where the outer surface cavity 17 lies is radially outward of the region where the planar slit 15 is situated. The tubular portion 12 is secured to the structural member 2 at those regions each of which is circumferentially adjacent to the one side of the open end of a corresponding one of the planar slits 15 and is at the end of the outer diameter of the tubular portion 12, and gaps are formed between the rest of the tubular portion 12 and the structural member 2 with the tubular portion 12 attached thereto.

In the configuration described above, the end of the planar slit 15 that is located on the outer surface 14 of the tubular portion 12 is a fixed end 15a, and the other end of the planar slit 15 is a free end 15b. That is, the open end of the planar slit 15, which is at the end of the outer diameter of the tubular portion 12, is the fixed end 15a, and the other end of the planar slit 15 is the free end 15b which is reversibly deformable over the predetermined width G (small width). Thus, in this configuration, arc-shaped springs are formed in the tubular portion 12, and the arc-shaped springs allow for elastically supporting the rotary shaft 1, thereby enhancing the damper effect. The stiffness of the arc-shaped springs can be varied by changing the radial locations of the planar slits 15 formed between the inner and outer surfaces 13 and 14 of the tubular portion 12. The material of the tubular portion 12 may be any material that allows the planar slits 15 to exhibit the spring effect. For example, stainless steel can be used as the material of the tubular portion 12.

The tubular portion 12 includes a plurality of damper fluid supply holes 18 extending from the outer surface 14 and respectively communicating with the planar slits 15. A damper fluid O is supplied to the planar slits 15 through the damper fluid supply holes 18. The "damper fluid" in the specification and claims of this application is a viscous fluid (such as an oil) for obtaining the damping action. The use of a viscous fluid for implementing the damping function is expected to offer a high level of damping. Specifically, the damper fluid O supplied into the planar slits 15 through the damper fluid supply holes 18 exhibits a damping effect in the planar slits 15, thereby achieving a high level of damping of radial vibration transmitted from the rotary shaft 1 to the bearing portion 11. The damping by the planar slits 15 can be effected over the predetermined width G (small width).

Further, in the present embodiment, sealing plates 25 are mounted on both axial end surfaces of the tubular portion 12 to provide sealing for preventing the damper fluid O from leaking out of the tubular portion 12. The sealing is provided along the circumference of each sealing plate 25 in a region radially inward of the planar slits 15 of the tubular portion 12 and in a region radially outward of the outer surface cavities 17 of the tubular portion 12. To effect this sealing, O-rings 26 as sealing members are fitted in O-ring grooves 27. The sealing by the O-rings 26 reliably prevents the damper fluid O from being mixed into the bearing fluid A.

In the present embodiment, the tubular portion 12 includes bearing fluid supply holes 19 located in the predetermined intervals between the planar slits 15. The bearing fluid supply holes 19 extend from the outer surface 14 to the inner surface 13 serving as the bearing portion 11 without passing through the planar slits 15. In the present embodiment, the bearing fluid supply holes 19 are located on both sides of each of the four planar slits 15; namely, the bearing fluid supply holes 19 are located between the planar slits 15 adjacent in the up-down direction and between the planar slits 15 adjacent in the left-right direction. The bearing fluid A is supplied between the inner surface 13 and the rotary shaft 1 through the bearing fluid supply holes 19. Since the bearing fluid supply holes 19 are located between the planar slits 15, the bearing fluid supply holes 19 do not interfere with the planar slits 15. The bearing fluid supply holes 19 and the damper fluid supply holes 18 are at different circumferential locations in the tubular portion 12. Thus, the bearing fluid A can be suitably supplied to the bearing portion 11 through the bearing fluid supply holes 19 formed in regions where none of the planar slits 15 is situated. A gas or liquid may be used as the bearing fluid A. The bearing portion 11 of the present embodiment is a hydrostatic gas bearing in which a gas is used.

In the outer surface 14 of the tubular portion 12, each region where the opening of the bearing fluid supply hole 19 is located is provided with an O-ring 21 for providing sealing along the circumference of the opening of the bearing fluid supply hole 19. The O-ring 21 is fitted in an O-ring groove 22 formed in the tubular portion 12. With the tubular portion 12 attached to the structural member 2, sealing is effected also between the tubular portion 12 and a bearing fluid supply portion 20 of the structural member 2.

In the first damper bearing 10, the bearing fluid supplied to the bearing portion 11 through the bearing fluid supply holes 19 enables the bearing portion 11 to perform the function of a hydrostatic bearing which supports the rotary shaft 1 in a non-contact manner. Additionally, the damper fluid O, which is supplied into the plurality of planar slits 15 each of which extends circumferentially in a region between the outer surface 14 and inner surface 13 of the tubular portion 12, allows for damping of vibration propagating radially from the bearing portion 11. Thus, the first damper bearing 10, which includes the bearing portion 11 formed by the inner surface 13 of the tubular portion 12 and serving as a hydrostatic bearing and which has a damper function provided by the planar slits 15, can be configured as a compact bearing with a small radial dimension.

Configuration of Damper Bearing According to Embodiment 2

Figure 3:
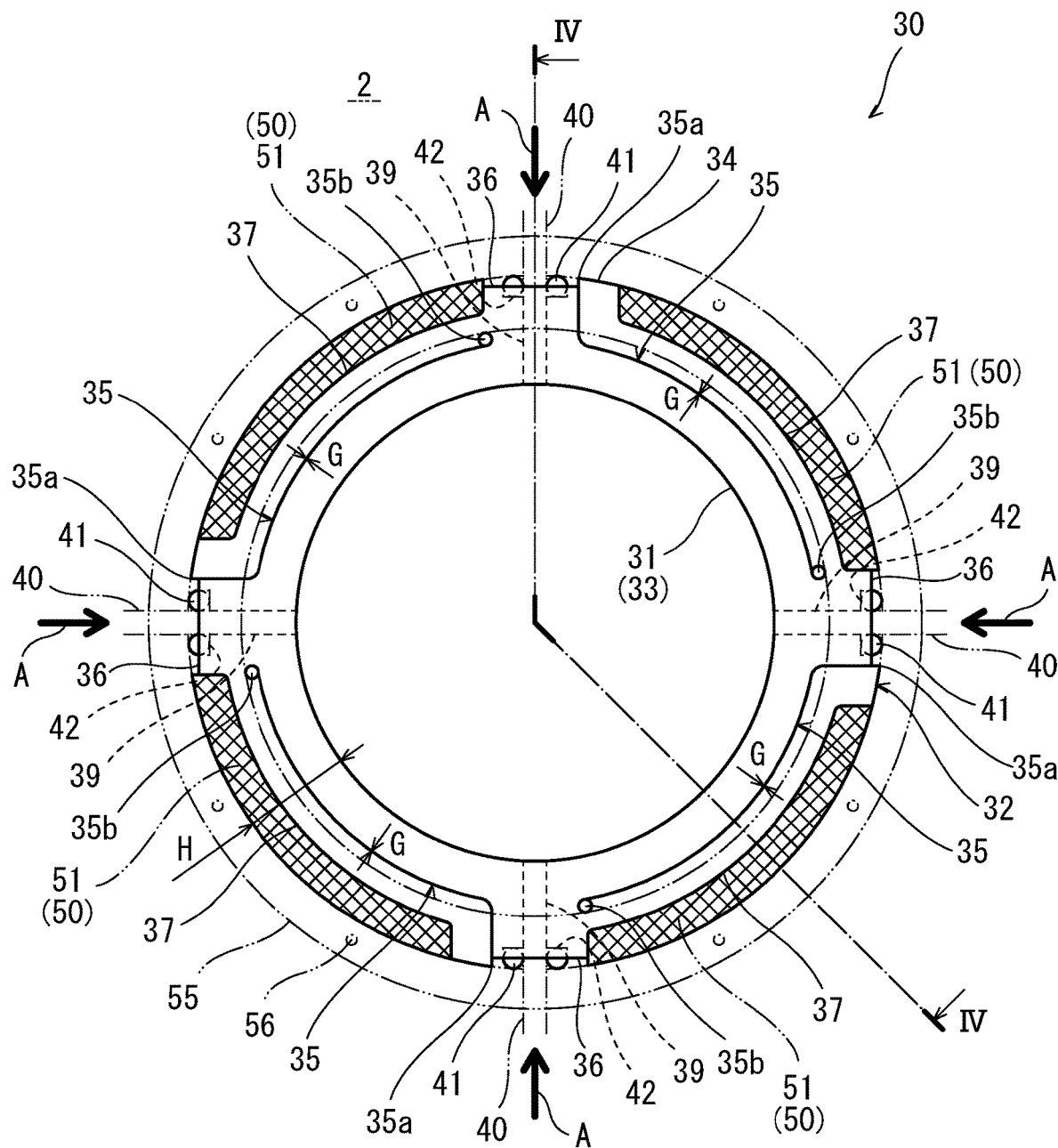
FIG. 3 is a front view of a second damper bearing according to Embodiment 2 of the present invention.
Figure 4:
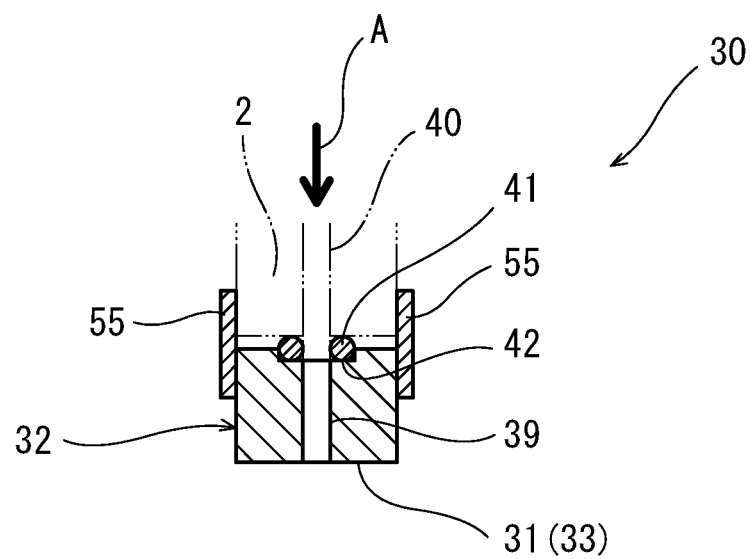
FIG. 4 is a cross-sectional view of the second damper bearing taken along the line IV-IV of FIG. 3.
Figure 4:
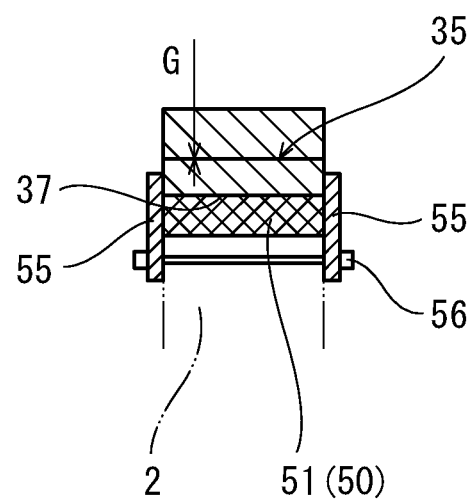

FIG. 3 is a front view of a second damper bearing 30 according to Embodiment 2. FIG. 4 is a cross-sectional view of the second damper bearing 30 taken along the line IV-IV of FIG. 3. The hydrostatic bearing-related elements of the second damper bearing 30 are the same as those of the first damper bearing 10. The same elements are denoted by reference signs corresponding to the reference signs of Embodiment 1 plus "20" and will not be described in detail.

The second damper bearing 30 according to Embodiment 2 also includes a bearing portion 31 that supports the rotary shaft 1 and a tubular portion 32 located around the outer circumference of the bearing portion 31 and attachable to the structural member 2. The bearing portion 31 is also a hydrostatic bearing, and an inner surface 33 of the tubular portion 32 serves as the bearing portion 31. The tubular portion 32 includes planar slits 35. Each planar slit 35 has an open end at an outer surface 34 of the tubular portion 32, extends radially from the open end, and extends circumferentially in an arc to a predetermined point in a region between the outer surface 34 and the inner surface 33. Each planar slit 35 has a predetermined width G (small width). The planar slits 35 are the same as the planar slits 15 of the first damper bearing 10 and will not be described in detail.

The tubular portion 32 includes bearing fluid supply holes 39 located in the predetermined intervals between the planar slits 35. The bearing fluid supply holes 39 extend from the outer surface 34 to the inner surface 33 serving as the bearing portion 31 without passing through the planar slits 35. In the present embodiment, the bearing fluid supply holes 39 are located on both sides of each of the four planar slits 35; namely, the bearing fluid supply holes 39 are located between the planar slits 35 adjacent in the up-down direction and between the planar slits 35 adjacent in the left-right direction. The bearing fluid A is supplied through the bearing fluid supply holes 39. Since the bearing fluid supply holes 39 are located between the planar slits 35, the bearing fluid supply holes 39 do not interfere with the planar slits 35. Thus, the bearing fluid A can be suitably supplied to the bearing portion 31 through the bearing fluid supply holes 39 formed in regions where none of the planar slits 35 is situated. The bearing portion 31 of the present embodiment is also a hydrostatic gas bearing in which a gas is used as the bearing fluid A.

In the outer surface 34 of the tubular portion 32, each region where the opening of the bearing fluid supply hole 39 is located is provided with an O-ring 41 for providing sealing along the circumference of the opening of the bearing fluid supply hole 39. The O-ring 41 is fitted in an O-ring groove 42 formed in the tubular portion 32. With the tubular portion 32 attached to the structural member 2, sealing is effected also between the tubular portion 32 and a bearing fluid supply portion 40 of the structural member 2.

The tubular portion 32 includes outer surface cavities 37 in each of which a solid damper element 50 is disposed. The outer surface cavities 37 are formed in the outer surface 34 and radially outward of the planar slits 35. Each outer surface cavity 37 is formed by cutting the outer surface 34 of the tubular portion 32 to a predetermined depth. Each outer surface cavity 37 receives the solid damper element 50. In this example, a metal wire mesh 51 having a predetermined thickness is used as the solid damper element 50. With the use of the wire mesh 51, radial vibration can be damped by friction arising from deformation of the wire mesh 51.

At both axial ends of the tubular portion 32 there are disposed retaining members 55 each of which serves as a retainer for preventing axial movement of the solid damper elements 50. Each retaining member 55 is a circular ring-shaped member having an inner diameter larger than the distance between the two opposite planar slits 15 of the tubular portion 32 and an outer diameter larger than the outer diameter of the tubular portion 32. The retaining members 55 are mounted along both axial ends of the tubular portion 32 and coupled by bolts 56. The retaining member 55 is an example of the retainer, and the retainer may be configured differently. The provision of the retaining members 55 can prevent axial movement of the solid damper elements 50 disposed in the outer surface cavities 37.

With this second damper bearing 30, vibration generated in the rotary shaft 1 and transmitted to the bearing portion 31 can be suitably damped by friction arising from deformation of the wire meshes 51 which are solid damper elements disposed in the outer surface cavities 37 of the outer surface of the tubular portion 32. Thus, radial vibration transmitted from the rotary shaft 1 to the bearing portion 31 can be suitably damped by the second damper bearing 30.

In the present embodiment, since the damping function is performed by the solid damper elements 50, any damper fluid such as an oil need not be supplied into the planar slits 15. Thus, the second damper bearing 30 can be configured as a bearing in which an oil or the like is not used. Additionally, the damping effect can be enhanced by providing the solid damper elements 50 over the entire width of the tubular portion 32. This makes it possible to reduce the radial dimension of the tubular portion 32 and construct a bearing particularly preferred for small rotary machines in which no oil is used.

Other Examples of Solid Damper Element

Figure 5:
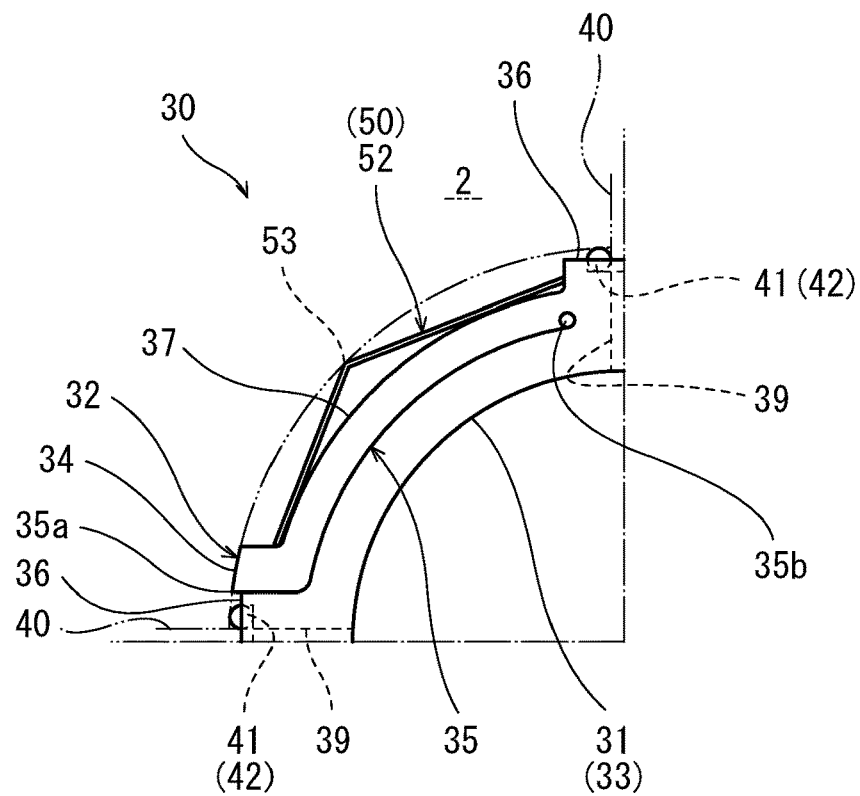
FIG. 5 is a partial view showing an alternative example of a solid damper element shown in FIG. 3.
Figure 6:
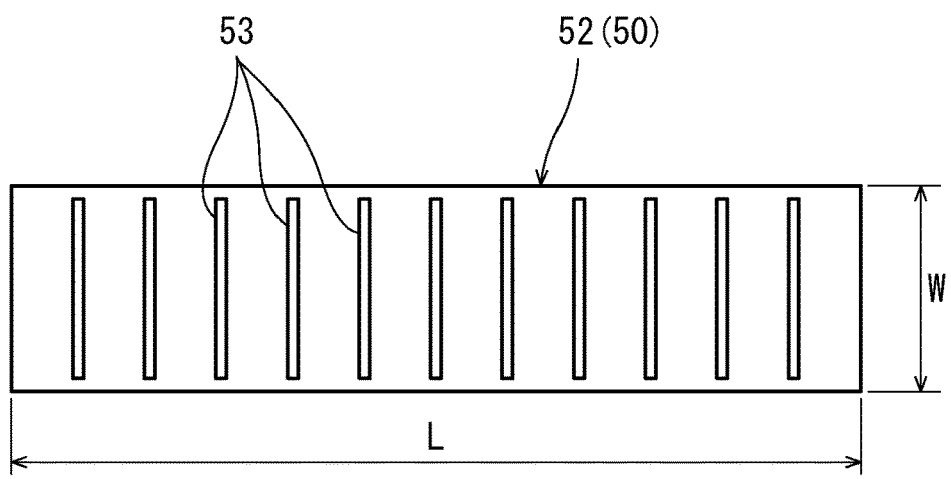
FIG. 6 is a plan view of the solid damper element of FIG. 5.
Figure 7:
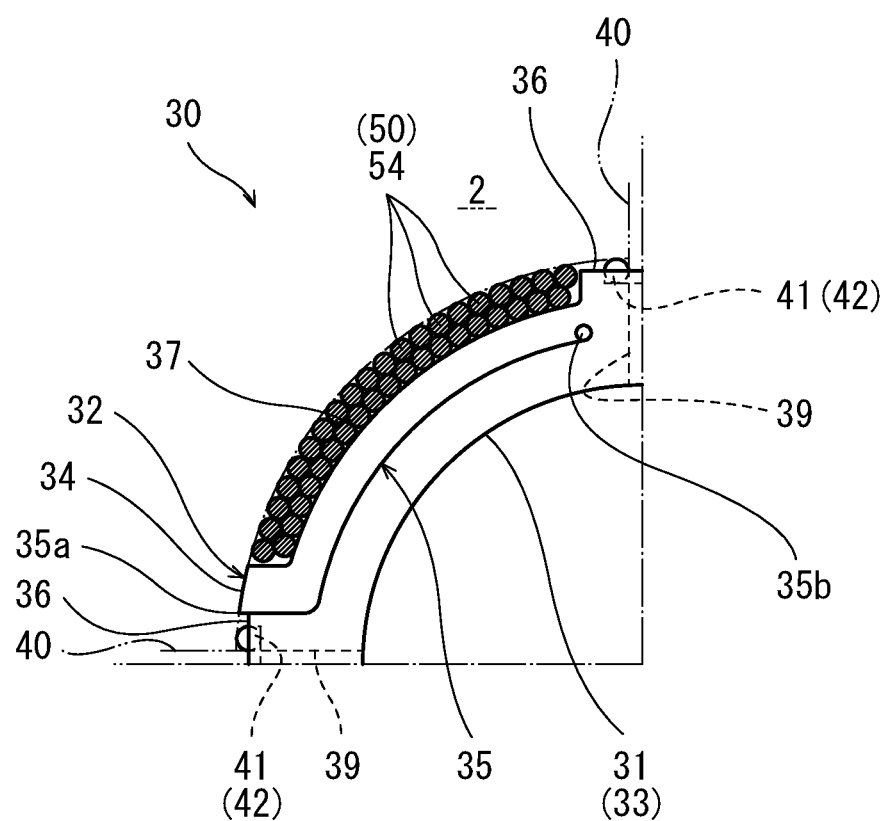
FIG. 7 is a partial view showing another alternative example of the solid damper element shown in FIG. 3.

FIG. 5 is a partial view of an alternative example of the solid damper element 50 shown in FIG. 3. FIG. 6 is a plan view of the solid damper element 50 of FIG. 5. FIG. 7 is a partial view of another alternative example of the solid damper element 50 shown in FIG. 3. A thin plate 52 with slits or spherical particles 54 made of resin may be used as the solid damper element 50 instead of the wire mesh 51 described above.

FIGS. 5 and 6 illustrate an example where the solid damper element 50 is the thin plate 52 with slits which is disposed in the outer surface cavity 37. As shown in FIG. 6, the thin plate 52 has a width W that is smaller than the axial length of the tubular portion 32 and a length L that allows the thin plate 52 to be placed within the circumferential length of the outer surface cavity 37. The thin plate 52 is, for example, embodied by a thin plate having a thickness of about 0.1 to 0.3 mm. The thin plate 52 is provided with slits 53 arranged at predetermined intervals in the longitudinal direction of the thin plate 52. The length of the slits 53 is smaller than the width W. The thin plate 52 is bendable at the slits 53.

As shown in FIG. 5, the thin plate 52 can be deformed (bent) at the slit 53 to damp radial vibration transmitted to the tubular portion 32. Thus, when the solid damper element is the thin plate 52, radial vibration propagating from the inner surface toward the outer surface of the tubular portion 32 can be damped by the thin plate 52.

FIG. 7 illustrates an example where the solid damper element 50 is constituted by spherical particles 54 packed in the outer surface cavity 37. An assembly of small spheres made of resin, metal, or ceramic may be used as the spherical particles 54. Axial movement of the spherical particles 54 packed in the outer surface cavity 37 is prevented by the retaining members 55.

With the use of such spherical particles 54, radial vibration transmitted to the tubular portion 32 can be damped by friction arising from movement of the spherical particles 54 within the outer surface cavity 37. Thus, when the solid damper element 50 is constituted by the spherical particles 54, radial vibration propagating from the inner surface 33 toward the outer surface 34 of the tubular portion 32 can be damped by the spherical particles 54.

Configuration of Damper Bearing According to Embodiment 3

Figure 8:
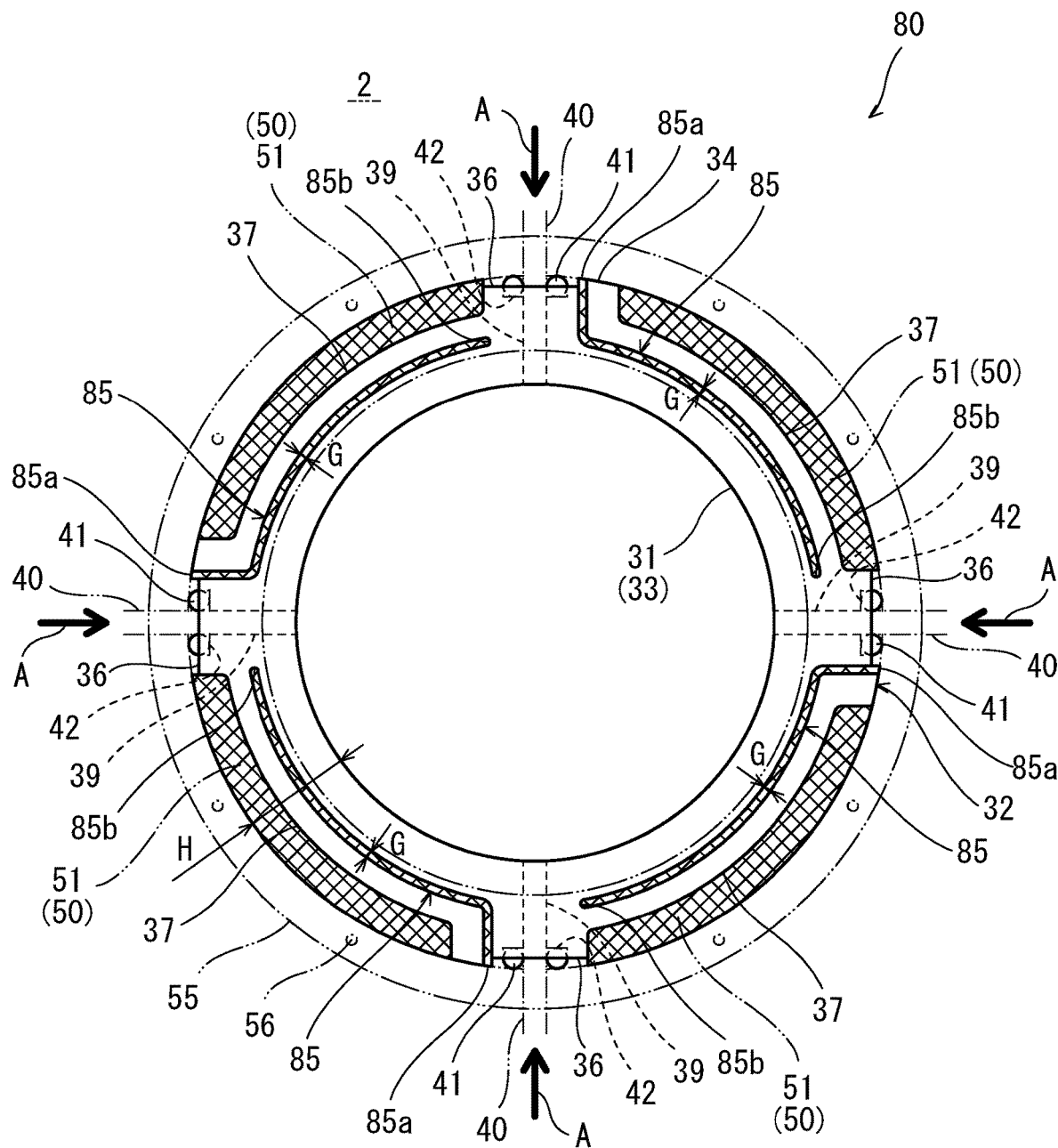
FIG. 8 is a front view of a third damper bearing according to Embodiment 3 of the present invention.

FIG. 8 is a front view of a third damper bearing 80 according to Embodiment 3. The difference between the third damper bearing 80 and the second damper bearing 30 lies in the planar slits 35, and the other elements of the damper bearing 80 are the same as those of the second damper bearing 30. The same elements are denoted by the same reference signs and will not be described again.

The third damper bearing 80 according to Embodiment 3 includes planar slits 85, and the predetermined width G of the planar slits 85 is large. The predetermined width G of the planar slits 85 of the third damper bearing 80 may be, for example, about 1 to 3 mm. The wire mesh 51 as the solid damper element 50 is placed in each planar slit 85. The solid damper element 50 placed in the planar slit 85 may be the thin plate 52 with slits. The other elements are the same as those of the second damper bearing 30 and will not be described again.

With this third damper bearing 80, vibration generated in the rotary shaft 1 and transmitted to the bearing portion 31 can be damped by the wire meshes 51 which are solid damper elements placed in the planar slits 85 having the predetermined width G. Further, vibration damping can be effected also by friction arising from deformation of the wire meshes 51 which are solid damper elements disposed in the outer surface cavities 37 of the outer surface of the tubular portion 32. Thus, radial vibration transmitted from the rotary shaft 1 to the bearing portion 31 can be suitably damped by the third damper bearing 80.

Additionally, in the present embodiment, since the damping function is performed by the solid damper elements 50, any damper fluid such as an oil need not be supplied into the planar slits 85. Thus, the third damper bearing 80 can be configured as a bearing in which an oil or the like is not used. This makes it possible to construct a damper bearing particularly preferred for small rotary machines in which the use of an oil is restricted.

Other Variants

The second damper bearing 30 is an example in which the inner surface 33 of the tubular portion 32 includes the bearing portion 31 which functions as a hydrostatic bearing. The second damper bearing 30 can be modified into a damper 60 by eliminating the hydrostatic bearing from the inner surface 33. The elements of the damper 60 which are the same as those of the second damper bearing 30 are denoted by the same reference signs and will not be described again. The damper 60 includes a tubular portion 62 configured similar to the tubular portion 32. However, the tubular portion 62 includes no bearing fluid supply hole 39. In the damper 60, a rolling bearing 70 can be provided on an inner surface 63 of the tubular portion 62.

Figure 9:
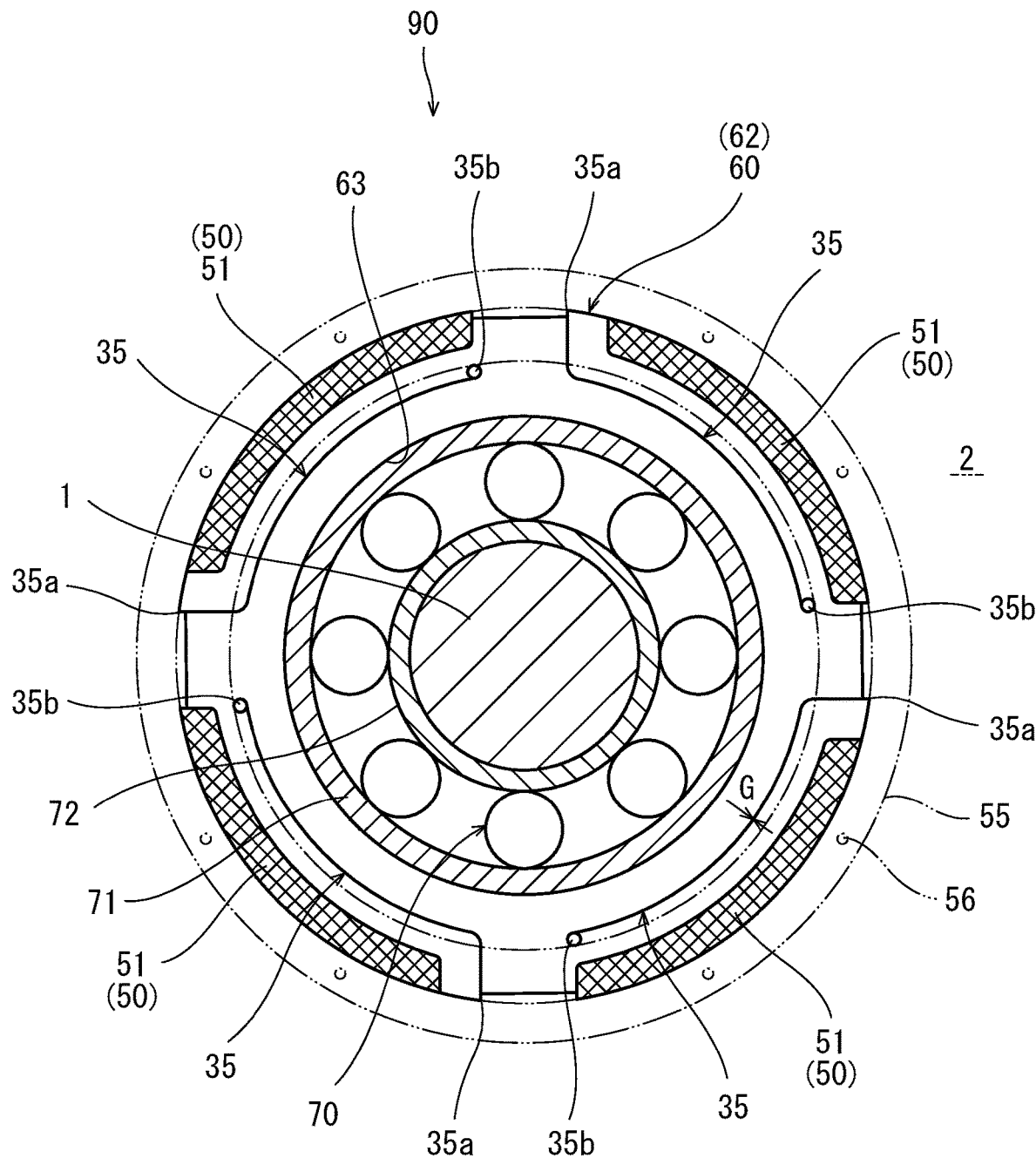
FIG. 9 is a front view showing an example where a damper of the present invention is equipped with a rolling bearing.

FIG. 9 is a front view showing an example where the damper 60 is equipped with the rolling bearing 70. In this example, an outer race 71 of the rolling bearing 70 is mounted on the inner surface 63 of the tubular portion 62 of the damper 60 within a predetermined tolerance. An inner race 72 of the rolling bearing 70 is mounted on the rotary shaft 1 within a predetermined tolerance. In this example, a fourth damper bearing 90 having a damper function is constructed by equipping the damper 60 with the rolling bearing 70.

With the fourth damper bearing 90, radially transmitted vibration can be suitably damped by the solid damper elements 50 over the entire axial length of the fourth damper bearing 90 despite the inclusion of the rolling bearing 70 which is disadvantageous in terms of damping of radial vibration.

While in the previously described embodiment the four planar slits 15 are arranged at regular intervals, the number of the planar slits 15 is not limited to a particular number. Two planar slits 15 may be placed opposite each other, three planar slits 15 may be arranged at regular intervals, or five or more planar slits 15 may be arranged at regular intervals. The number of the planar slits 15 is not limited to that in the previously described embodiment.

The above embodiments are merely examples given for illustrative purposes. The present invention is not limited to the above embodiments, and various modifications may be made without departing from the gist of the present invention.

CONCLUSION

As seen from the foregoing description, the first and second damper bearings 10 and 30, each of which includes the bearing portion 11 or 31 serving as a hydrostatic bearing and exhibits a vibration damping function over the entire axial length of the tubular portion 12 or 32, can be configured to have a small radial dimension. Thus, these damper bearings can be included in small rotary machines. With the use of the damper bearing 10 or 30 in a small high-speed rotary machine in which the rotary shaft 1 is supported by a hydrostatic bearing (examples of such a small high-speed rotary machine include a centrifugal compressor and a hydrogen turboexpander), vibration transmitted from the rotary shaft 1 can be damped to achieve improved performance.

The damper 60, which exhibits a significant damping effect by virtue of the solid damper elements 50 provided over the entire axial length of the tubular portion 62, can be configured to have a small radial dimension. Thus, the damper 60 can be used in a bearing of a small rotary machine. In particular, a damper bearing can be constructed which is advantageous for use in a small rotary machine in which any oil cannot be used. The damper 60 can be used in a rotary machine in which the rotary shaft 1 is supported by the rolling bearing 70 (examples of such a rotary machine include a small gas turbine, an aircraft engine, and a turbo refrigerator). The damper 60 is compact and light-weight and able to stably exhibit the vibration damping effect.

REFERENCE SIGNS LIST 1 rotary shaft
10 first damper bearing
11 bearing portion
12 tubular portion
13 inner surface
14 outer surface
15 planar slit
15a fixed end
15b free end
17 outer surface cavity
18 damper fluid supply hole
19 bearing fluid supply hole
30 second damper bearing
31 bearing portion
32 tubular portion
33 inner surface
34 outer surface
35 planar slit
35a fixed end
35b free end
37 outer surface cavity
39 bearing fluid supply hole
50 solid damper element
51 wire mesh
52 thin plate with slits
54 spherical particle
55 retaining member (retainer)
60 damper
62 tubular portion
63 inner surface
70 rolling bearing
80 third damper bearing
90 fourth damper bearing
A bearing fluid
O damper fluid
G predetermined width
H radial thickness
S bearing clearance

The invention claimed is:

1. A damper bearing comprising:
a bearing portion that supports a rotary shaft; and
a tubular portion located around an outer circumference of the bearing portion, the tubular portion having a predetermined radial thickness and having an outer surface attachable to a structural member, wherein
the bearing portion is configured as a hydrostatic bearing that supports the rotary shaft with a predetermined bearing clearance between the hydrostatic bearing and the rotary shaft,
the tubular portion includes a plurality of planar slits located between the outer surface of the tubular portion and an inner surface of the tubular portion, each planar slit having a predetermined width, extending circumferentially, and further extending through an entire axial length of the tubular portion,
the planar slits are arranged circumferentially at predetermined intervals in the tubular portion,
each planar slit has an open end at the outer surface of the tubular portion, extends radially from the open end, and extends circumferentially in an arc to a predetermined point in a region between the outer surface and the inner surface, and
the tubular portion includes a bearing fluid supply hole formed in a region where none of the planar slits are situated, the bearing fluid supply hole extending from the outer surface of the tubular portion to the bearing portion without passing through any of the planar slits.

2. The damper bearing according to claim 1, wherein the tubular portion further includes:
an outer surface cavity formed in the outer surface, the outer surface cavity being radially outward of one planar slit of the plurality of planar slits; and
a damper fluid supply hole through which a damper fluid is supplied from the outer surface at least into the outer surface cavity or into the one planar slit.

3. The damper bearing according to claim 2, wherein
the bearing fluid supply hole and the damper fluid supply hole are at different circumferential locations in the tubular portion, and
a sealing member is disposed between the bearing fluid supply hole and the damper fluid supply hole to prevent the damper fluid from being mixed into a bearing fluid supplied through the bearing fluid supply hole.

4. The damper bearing according to claim 1, wherein the tubular portion further includes:
an outer surface cavity formed in the outer surface, the outer surface cavity being radially outward of one planar slit of the plurality of planar slits; and
a solid damper element disposed at least in the outer surface cavity or in the one planar slit.

5. The damper bearing according to claim 4, wherein the tubular portion further includes a retaining member that prevents axial movement of the solid damper element, the retaining member being disposed at each axial end of the tubular portion.

6. A damper adapted to damp vibration transmitted radially from a rotary shaft, the damper comprising a tubular portion to be located around an outer circumference of the rotary shaft, the tubular portion having a predetermined radial thickness and having an outer surface attachable to a structural member, wherein
the tubular portion includes a plurality of planar slits located between the outer surface of the tubular portion and an inner surface of the tubular portion, each planar slit having a small width, extending circumferentially, and further extending through an entire axial length of the tubular portion,
the planar slits are arranged circumferentially at predetermined intervals in the tubular portion,
each planar slit has an open end at the outer surface of the tubular portion, extends radially from the open end, and extends circumferentially in an arc to a predetermined point in a region between the outer surface and the inner surface, and the tubular portion further includes: an outer surface cavity radially outward of one planar slit of the plurality of planar slits; and a solid damper element disposed at least in the outer surface cavity or in the one planar slit.

7. The damper according to claim 6, wherein the tubular portion further includes a retaining member that prevents axial movement of the solid damper element, the retaining member being disposed at each axial end of the tubular portion.

8. The damper according to claim 7, wherein the solid damper element is a wire mesh having a predetermined thickness.

9. The damper according to claim 7, wherein the solid damper element is a thin bendable plate with a slit.

10. The damper according to claim 7, wherein the solid damper element is an assembly of spherical particles.

11. The damper according to claim 6, wherein the solid damper element is a wire mesh having a predetermined thickness.

12. The damper according to claim 6, wherein the solid damper element is a thin bendable plate with a slit.

13. The damper according to claim 6, wherein the solid damper element is an assembly of spherical particles.

* * * * *